(No Model.)
J. HOLAHAN.
REGISTER FOR GUNS.
No. 252,944. Patented Jan. 31, 1882.
Fig. 1.
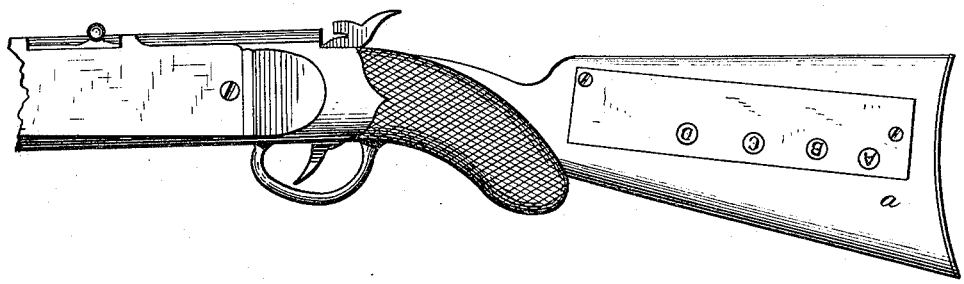
Fig. 2.
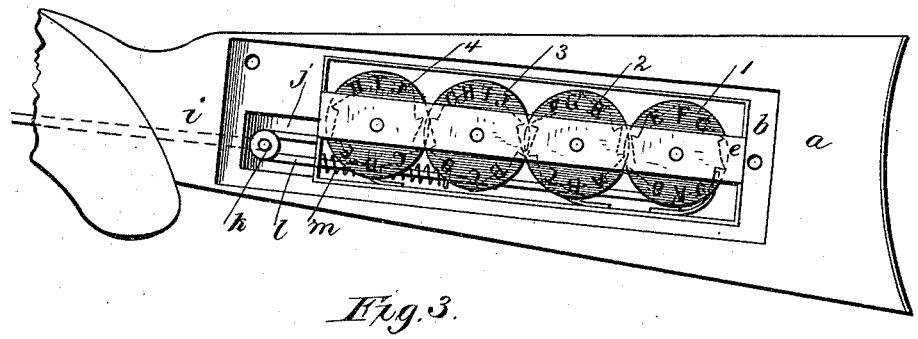
Fig. 3.
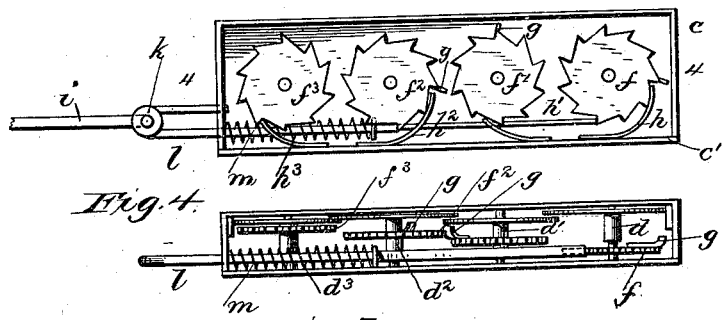
Fig. 4.
Fig. 5.
Witnesses.
Franck L. Durand
Wm. L. Speiden
Inventor,
James Holahan
Andrew O'Neill Chas J Gooch
attys

UNITED STATES PATENT OFFICE.

JAMES HOLAHAN, OF ANSONIA, CONNECTICUT.

REGISTER FOR GUNS.

SPECIFICATION forming part of Letters Patent No. 252,944, dated January 31, 1882.

Application filed July 15, 1881. (No model.)

*To all whom it may concern:*

Be it known that I, JAMES HOLAHAN, a citizen of the United States, residing at Ansonia, in the county of New Haven and State of Connecticut, have invented certain new and useful Improvements in Registers for Guns or other Purposes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention consists in a device, as hereinafter described and claimed, for attachment to fire-arms, whereby the number of times said arms are discharged may be accurately registered and readily ascertained.

In the drawings, Figure 1 represents the butt of a rifle having my improvement applied thereto. Fig. 2 is a similar view with the inclosing plate removed. Fig. 3 represents the mechanism for operating the dials, with its inclosing case. Fig. 4 is a section on the line 4 4, Fig. 3. Fig. 5 shows a ratchet-wheel separately.

The device is especially intended for application to fire-arms used in shooting-galleries and other places where it is desired to ascertain the number of times such arms have been discharged, and affords a ready means whereby each discharge shall be automatically registered by the operation of firing, and the number of discharges indicated in a manner to be readily observable.

$a$ represents the butt of the fire-arm, which is recessed at $b$ to receive the case $c$, inclosing the registering and indicating mechanism. Within the case $c$ are journaled, with capability of rotation, vertical shafts $d\ d'\ d^2\ d^3$, whose upper ends are similarly journaled in a plate or strip, $e$, secured at either end to the ends of the case, and serving to hold the dials in position therein.

To one end of shaft $d$ is rigidly secured a hooked wheel, $f$, to the top face of which (or to that portion of the shaft above the wheel) is secured an outwardly and upwardly extending lug, $g$, which, on the revolution of said wheel $f$, engages with the teeth of the toothed wheel $f'$ on the shaft $d'$, and thereby causes said wheel $f'$ to move the distance of one tooth forward at each revolution of the wheel $f$. The wheel $f'$ is secured upon its shaft $d'$ at a slight elevation above the line of rotation of the tooth $f$, in order that the revolution of said tooth $f$ may not cause it to interfere with the teeth on the wheel $f'$. The toothed wheels $f^2\ f^3$ on the shafts $d^2\ d^3$ respectively are similarly secured on said shafts at different elevations for the same purpose. By securing the lugs $g$ on either the shafts or the respective toothed wheels to project outwardly and upward I insure their engagement with a tooth of the next forward wheel whenever the wheel next in rear thereof has rotated once.

Each dial 1, 2, 3, 4 has upon its upper face ten letters, from A to J, or ten numerals, so that on the first dial, 1, being revolved entirely around and the second dial, 2, moved around the distance of one tooth the indicator will show that ten shots have been fired from the arm. Each complete revolution of the second dial, 2, will cause the third dial, 3, to indicate that one hundred shots have been fired, and so on.

One side, $c'$, of the casing is removable, and has secured to its inner face four flat springs, $h\ h'\ h^2\ h^3$. These springs are either soldered, riveted, or otherwise secured at their inner ends to the removable side, their free ends projecting within the casing and engaging with the teeth of their respective ratchet-wheels to prevent their backward movement.

A rod, $i$, projects outward from the forward end of the attachment, which is suitably slotted at $j$ to receive the same, and it is designed that this rod shall project sufficiently far to come in contact with the lock or trigger mechanism, so that on the trigger being retracted a backward movement will be imparted to the said rod, which is attached at its inner end by means of an eye, $k$, to another rod, $l$, which passes through a coiled spring, $m$, to the ratchet-wheel $f$ at the rear end of the attachment. The rearward movement of this rod $i$ will therefore push back the rod $l$, which latter will push the ratchet-wheel $f$ forward the distance of one tooth at each backward movement of said rods, and thereby register one point each time the arm is discharged. The spiral spring $m$ is secured at its ends to the casing $c$ and rod $l$, respectively, and acts to draw back the rod $l$ to its forward or non-operating position after the disk and ratchet-wheel at the rear have been actuated.

This attachment is capable of ready application to fire-arms of various descriptions and affords a ready means whereby the number of times such arms are used can be readily ascertained. It thereby avoids loss to proprietors of shooting-galleries and other places where a price is charged for the use of arms according to the number of dicharges, and tends to prevent fraudulent statements on the part of his employés of the amount of business transacted is such places, as by computing the number of charges expelled the proprietor can readily tell the amount of receipts properly forthcoming.

Any suitable and well-known means may be employed for securing the attachment within the arm in order that it may not be possible for an unauthorized person to remove it.

Having thus described my invention, what I claim as new, and desire to secure by Letters Patent, is—

The attachment, herein described, consisting of casing $c$, vertical shafts $d\ d'\ d^2\ d^3$, ratchet-wheels $f\ f'\ f^2\ f^3$, lugs $g$ for engaging the teeth of said wheels, springs $h\ h'\ h^2\ h^3$ to prevent the backward rotation of said wheels, rods $i$ and $l$, and spiral spring $m$, in combination with a gun-lock, substantially as and for the purpose set forth.

In testimony whereof I affix my signature in presence of two witnesses.

JAMES HOLAHAN.

Witnesses:
   WALTER JAS. SCOTT,
   ELI. MIX.